United States Patent
Bonas et al.

(10) Patent No.: US 11,368,523 B2
(45) Date of Patent: Jun. 21, 2022

(54) TRAFFIC MANAGEMENT FOR MULTIPLE VERSIONS OF AN APPLICATION DEPLOYED IN A COMPUTER SYSTEM

(71) Applicant: Red Hat, Inc., Raleigh, NC (US)

(72) Inventors: Alissa Bonas, Raanana (IL); Heiko Rupp, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 33 days.

(21) Appl. No.: 16/407,998

(22) Filed: May 9, 2019

(65) Prior Publication Data

US 2020/0358846 A1 Nov. 12, 2020

(51) Int. Cl.
*H04L 67/1001* (2022.01)
*G06F 8/60* (2018.01)
*G06F 8/71* (2018.01)
*H04L 67/51* (2022.01)
*H04L 67/00* (2022.01)
*G06F 11/34* (2006.01)

(52) U.S. Cl.
CPC ............ *H04L 67/1002* (2013.01); *G06F 8/60* (2013.01); *G06F 8/71* (2013.01)

(58) Field of Classification Search
CPC ..... H04L 67/1002; H04L 67/34; H04L 67/16; G06F 8/71; G06F 8/60; G06F 11/3409
See application file for complete search history.

(56) References Cited

U.S. PATENT DOCUMENTS

| | | | |
|---|---|---|---|
| 9,225,621 B2 | 12/2015 | Tseitlin et al. | |
| 9,606,899 B1* | 3/2017 | Siddiqui | G06F 11/3006 |
| 2014/0282422 A1 | 9/2014 | Tuffs et al. | |
| 2015/0278517 A1* | 10/2015 | Weaver | G06F 11/3608 726/26 |
| 2016/0119207 A1* | 4/2016 | Tseitlin | H04L 43/08 709/224 |
| 2019/0250949 A1* | 8/2019 | Chen | H04L 41/082 |
| 2019/0289057 A1* | 9/2019 | Chen | G06F 8/71 |
| 2020/0112487 A1* | 4/2020 | Inamdar | H04L 67/10 |

\* cited by examiner

*Primary Examiner* — Uzma Alam
*Assistant Examiner* — Kamal Hossain
(74) *Attorney, Agent, or Firm* — Lowenstein Sandler LLP

(57) ABSTRACT

Aspects of the disclosure provide for managing traffic for multiple versions of an application deployed in a computer system. A method of the disclosure includes: determining first workload information relating to a deployment of a first version of an application in a computer system and second workload information relating to a deployment of a second version of the application in the computer system; determining traffic information relating to the deployment of the first version of the application, wherein the traffic information comprises information about traffic handled by the first version of the application during a time frame; and determining an amount of traffic to be routed to the second version of the application in view of the first workload information, the second workload information, and the traffic information.

19 Claims, 9 Drawing Sheets

TRAFFIC MANAGEMENT FOR MULTIPLE VERSIONS OF AN APPLICATION DEPLOYED IN A COMPUTER SYSTEM

TECHNICAL FIELD

The implementations of the disclosure generally relate to computer systems and, more specifically, to managing traffic for multiple versions of an application deployed in a computer system.

BACKGROUND

Software development may involve deploying multiple versions of an application in a production environment to introduce changes to the source code and/or functionality of the application. For example, a canary deployment may be implemented to release a new version of the application and to introduce changes to an old version of the application that has been deployed in an infrastructure (e.g., a certain number of servers). To reduce the impact of the new version of the application to users of the application, the new version of the application may be deployed in a subset of the infrastructure as a canary version, which is a version that is available only to a small group (subset) of the users of the application. If no errors are reported with respect to the canary version, the new version of the application may gradually roll out to the rest of the infrastructure and may be available to all of the users of the application. Alternatively, the users may be rerouted back to the old version of the application if the performance of the canary version is not considered satisfactory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
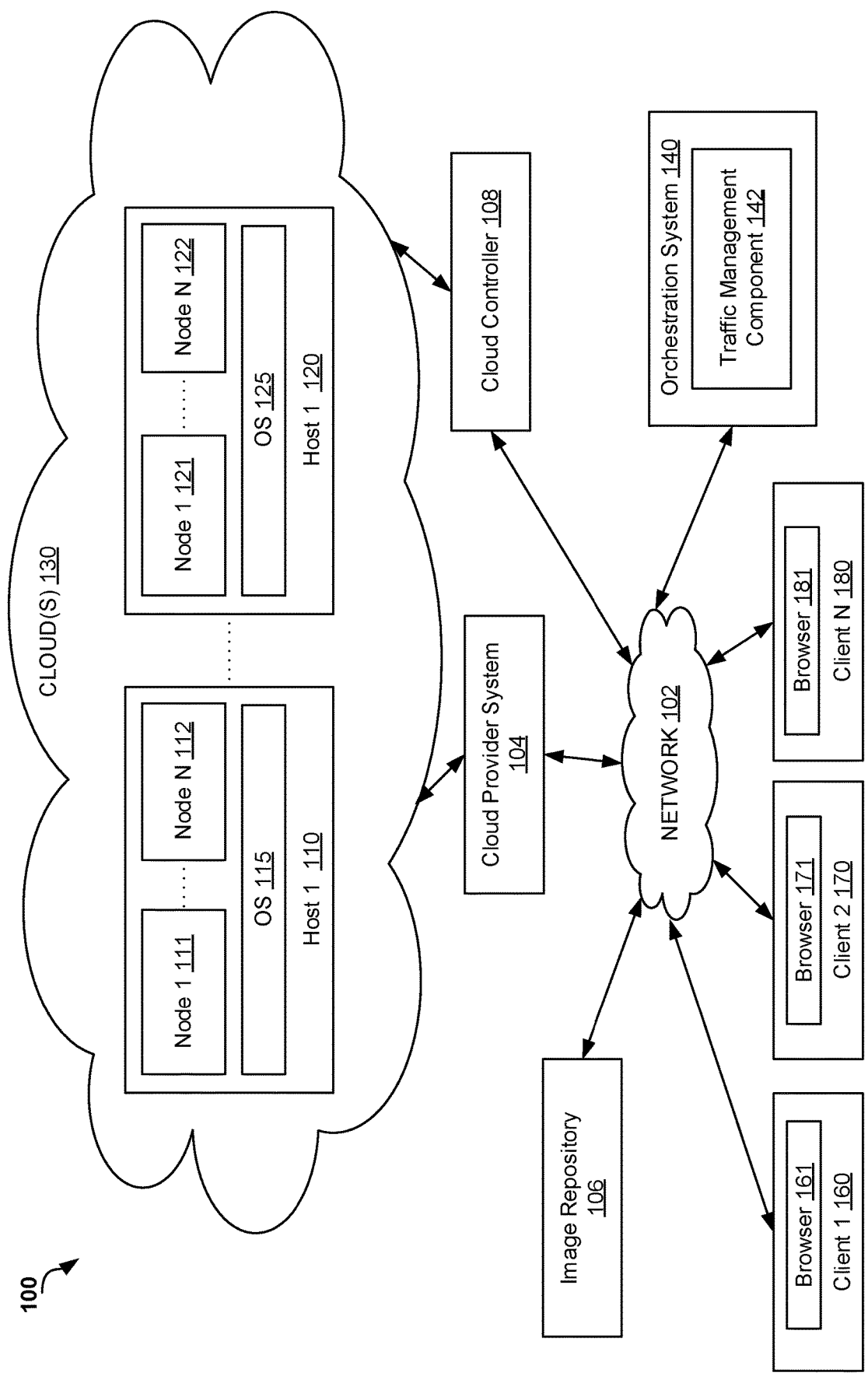
FIG. 1 is a block diagram of a network architecture in which implementations of the disclosure may operate.

Canary deployments are becoming more common especially in containerized environments, where specific routing policies and load balancing policies may be configured to route traffic and/or users for an application to different versions of the application, such as a canary version and a regular version of the application. To implement a canary deployment, a suitable amount of traffic should be routed to the canary version so that the canary version may perform as designed in the computer system. For example, if one instance is deployed to implement the canary version of the application while four instances are deployed to implement the regular version of the application, routing 30% of the traffic for the application to the canary version may cause decreased performance and unexpected behavior of the canary version of the application. Such performance issues of the canary version are caused by routing a disproportionately large percentage of traffic to the canary version. However, existing software deployment techniques do not provide solutions for addressing such performance issues and may cause a user to attribute such performance issues to the source code and/or functionality of the canary version.

Aspects of the present disclosure address the above and other deficiencies by providing mechanisms (e.g., methods, systems, non-transitory computer-readable medium, etc.) for managing traffic for multiple versions of an application deployed in a computer system. In some embodiments, the mechanisms may route traffic for the application in view of workload information and/or traffic information of the versions of the application. For example, the mechanisms may determine workload information relating to deployments of a first version of an application and a second version of the application in the computer system, such as the number of instances of the first version of the application deployed in the computer system, the number of instances of the second version of the application to be deployed in the computer system, etc. The first version and the second version of the application may be an old version of the application and a new version of the application, respectively. The second version of the application may be deployed as a canary version in some embodiments.

The mechanisms may further determine traffic information relating to the first version of the application deployed in the computer system. For example, the mechanisms may determine an amount of traffic that the first version of the application is capable of handling during a time frame (e.g., a few hours, a few minutes).

The mechanisms may then determine an amount of traffic to be routed to the second version of the application in view of the workload information related to the first version and/or the second version of the application and the traffic information relating to the first version of the application. For example, the mechanisms may determine the maximum amount of traffic that may be routed to the second version of the application in view of a ratio of the number of the instances of the second version of the application to the number of the instances of the first version of the application. In some embodiments, a ratio of the maximum amount of traffic to be routed to the second version of the application to the amount of traffic that the first version of the application is capable of handling during the time frame may correspond to the ratio of the number of the instances of the second version of the application to the number of the instances of the first version of the application.

In some embodiments, the mechanisms may provide the amount of traffic that may be routed to the second version of the application to a user as a recommend amount of traffic to be routed to the second version of the application. In some embodiments, the mechanisms can route traffic for the application in view of the amount of traffic that may be routed to the second version of the application. For example, the mechanisms may route a portion of traffic destined to the application to the second version of the application deployed in the computer system. The portion of the traffic destined to the application may be equal to or less than the maximum amount of traffic that may be routed to the second version of the application. In some embodiments, the mechanisms may progressively increase the portion of the traffic for the application that is routed to the second version of the application until the maximum amount of traffic is routed to the second version of the application.

The systems and methods described herein include technology that enhances software deployments for a computer system. Compared to conventional software deployments techniques, the mechanisms disclosed herein may reduce potential performances issues in deployments of a new version of an application (e.g., a canary deployment) that are unrelated to source code and/or functionality of the new version.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 may include a cloud-computing environment 130 (also referred to herein as a cloud) that includes nodes 111, 112, 121, 122 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. In some implementations, an environment other than a VM may be used to execute functionality of the PaaS applications. When nodes 111, 112, 121, 122 are implemented as VMs, they may be executed by operating systems (OSs) 115, 125 on each host machine 110, 120.

In some implementations, the host machines 110, 120 may be located in a data center. Users can interact with applications executing on the cloud-based nodes 111, 112, 121, 122 using client computer systems, such as clients 160, 170, and 180, via corresponding web browser applications 161, 171, and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in cloud(s) 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121, 122. This data may be used for the execution of applications for a multi-tenant PaaS system managed by the PaaS provider controller 140.

In one implementation, the data associated with the application may include data used for executions of one or more containers that include application images built from pre-existing application components and source code of users managing the application. As used herein, an image may refer to data representing executables and files of the application used to deploy functionality for a runtime instance of the application. In one implementation, the image can be built using suitable containerization technologies (e.g., using a Docker tool).

In some embodiments, each of nodes 111, 112, 121, 122 can host one or more containers. Each of the containers may be a secure process space on the nodes 111, 112, 121 and 122 to execute the functionality of an application and/or service. In some implementations, a container is established at the nodes 111, 112, 121 and 122 with access to certain resources of the underlying node, including memory, storage, etc. In one implementation, the containers may be established using the Linux Containers (LXC) method, cgroups, SELinux™, and kernel namespaces, etc. A container may serve as an interface between a host machine and a software application. The software application may comprise one or more related processes and may provide a certain service (e.g., an HTTP server, a database server, etc.). Containerization is an operating-system-level virtualization environment of a host machine that provides a way to isolate service processes (e.g., micro-service processes). At the same time, employing the containers makes it possible to develop and deploy new cloud-based micro-services in a cloud-based system.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100 may communicate with one or more other services in system 100. In one implementation, an application may be deployed as one or more services on one or more nodes 111, 112, 121, 122. Each of the services may be deployed in one or more containers. In some implementations, a service may be an application. "Application" and "service" are used herein interchangeably.

In some embodiments, an application may be deployed as a plurality of services (e.g., micro-services) on one or more of the nodes. Each of the services may be hosted by one or more containers. More particularly, for example, multiple replicas of a service may be host by a plurality of containers running on one or more nodes. Each of the replicas may represent an instance of the service and may provide the same functionality of the service.

A micro-service may be an independently-deployable modular service that may communicate with other services in a system (e.g., a cloud-based system) through a lightweight interface. The code of the software application may be stored along with micro-services in containers to create containerized applications. The containerized application may be released as software product that can be executed as a self-contained application on nodes in a cloud. Each of the nodes (e.g., a host computer, a virtual machine, etc.) may support a container execution environment (e.g., a Docker™ environment). Employing such micro-services allows breaking down complex applications into relatively simple independent processes, thus producing highly decoupled systems. Each system may include multiple applications that are hosted on a provider's infrastructure. Each process associated with the services is focusing on doing a relatively simple task to support the applications for each individual costumer.

Figure 5:
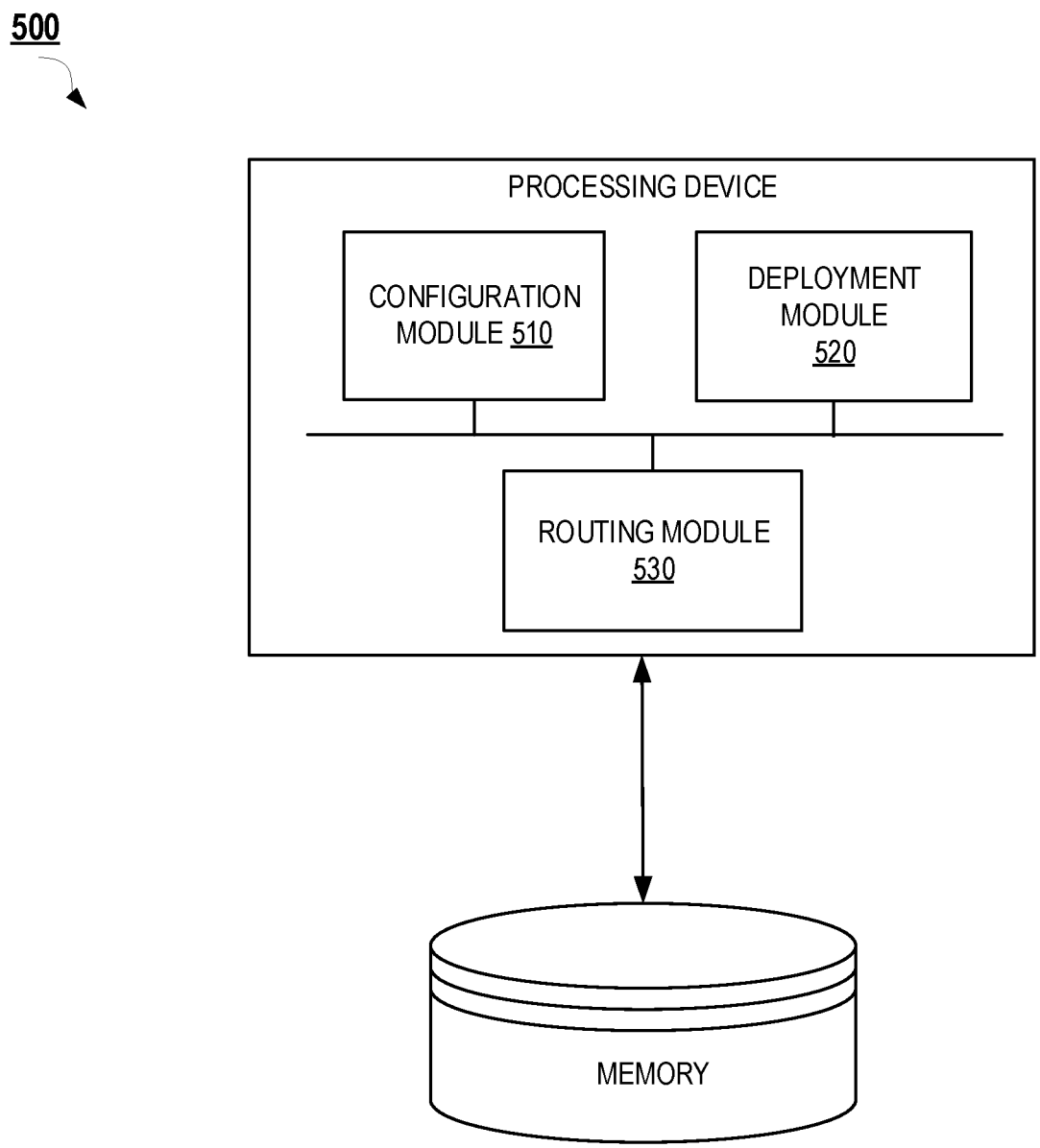

Orchestration system 140 may provide management and orchestration functions for deploying and/or managing applications and/or services of system 100. For example, orchestration system 140 can build one or more container images for providing functionality of the applications and/or the services. The orchestration system 140 can then create one or more containers to host the application and/or service (e.g., by instructing one or more nodes 111, 112, 121, 122 to instantiate one or more containers from the container image (s)). Orchestration system 140 can include one or more computing devices (e.g., a computing device as shown in FIG. 5). Orchestration system 140 can implement an application programming interface to facilitate deployment, scaling, and/or management of containerized software applications.

In some embodiments, orchestration system 140 can deploy an application as one or more applications and/or services on one or more nodes. Each of the applications and/or services may be deployed in one or more containers. In some embodiments, a replica of an application and/or service may be created by deploying one or more containers on a node.

In some embodiments, orchestration system 140 can deploy multiple versions of an application and/or service in system 100. For example, a given version of the application and/or service may be deployed as one or more instances. Each of the instances may correspond to a replica of the given version of the application and/or version and may be deployed in one or more containers, nodes, and/or any other components of system 100 that may host an instance of an application and/or service.

As shown in FIG. 1, the orchestration system 140 may include a traffic management component 142 that can perform traffic management and other functions for applications and/or services hosted by nodes 111, 112, 121, 122. For example, the traffic management component 142 may manage traffic for an application by routing the traffic to one or more versions of the application. More particularly, for example, the traffic management component 142 may route a first proportion (e.g., 90%) of traffic destined to the application to a first version of the application deployed in system 100 and may route a second proportion (e.g., 10%) of traffic destined to the application to a second version of the application deployed in system 100. In some embodiments, the first version of the application may be an old version of the application. The second version of the application may be a new version of the application (e.g., a canary version). The source code of the second version of the application may include changes to the source code of the first version of the application.

In some embodiments, the traffic management component 142 may route certain traffic to the second version of the application. For example, the traffic management component 142 may route requests initiated by certain users (e.g., users with certain identifiers, users in specific geographic regions, etc.). As another example, the traffic management component 142 may route requests of certain content (e.g., requests for a particular web service) to the second version of the application.

In some embodiments, the traffic management component 142 may route traffic for the application in view of workload information and/or traffic information of various versions of the application. For example, the traffic management component 142 may determine workload information relating to deployments of the first version of the application and the second version of the application in system 100, such as the number of instances of the first version of the application deployed in system 100, the number of instances of the second version of the application to be deployed in system 100, etc.

The traffic management component 142 may also determine traffic information relating to the first version of the application deployed in the computer system, such as an amount of traffic that the first version of the application is capable of handling during a time frame (e.g., a few hours, a few minutes).

The traffic management component 142 may then determine an amount of traffic to be routed to the second version of the application in view of the workload information related to the first version and/or the second version of the application and the traffic information relating to the first version of the application. For example, the traffic management component 142 may determine the maximum amount of traffic that may be routed to the second version of the application in view of a ratio of the number of the instances of the second version of the application to the number of the instances of the first version of the application. In some embodiments, a ratio of the maximum amount of traffic to be routed to the second version of the application to the amount of traffic that the first version of the application is capable of handling during the time frame may correspond to the ratio of the number of the instances of the second version of the application to the number of the instances of the first version of the application.

In some embodiments, the traffic management component 142 may provide the amount of traffic that may be routed to the second version of the application to a user as a recommend amount of traffic to be routed to the second version of the application. In some embodiments, the traffic management component 142 can route traffic for the application in view of the amount of traffic that may be routed to the second version of the application. For example, the traffic management component 142 may route a portion of traffic destined to the application to the second version of the application deployed in the computer system. The portion of the traffic destined to the application may be equal to or less than the maximum amount of traffic that may be routed to the second version of the application. In some embodiments, the traffic management component 142 may progressively increase the portion of the traffic for the application that is routed to the second version of the application until the maximum amount of traffic is routed to the second version of the application.

In some embodiments, the traffic management component 142 can include one or more components described in connection with FIGS. 2-5 and can implement one or more methods described in connection with FIGS. 6-8.

While various implementations are described in terms of the environment described above, the facility may be implemented in a variety of other environments including a single, monolithic computer system, as well as various other combinations of computer systems or similar devices connected in various ways. For example, the controller component 142 and/or one or more portions of the traffic management component 142 may be running on a node, such as nodes 111, 112, 121, 122, of the system 100 hosted by cloud 130, or may execute external to cloud 130 on a separate server device. In some implementations, the controller component 142 may include more components than what is shown that may operate in conjunction with the PaaS system of network 100.

Figure 2:
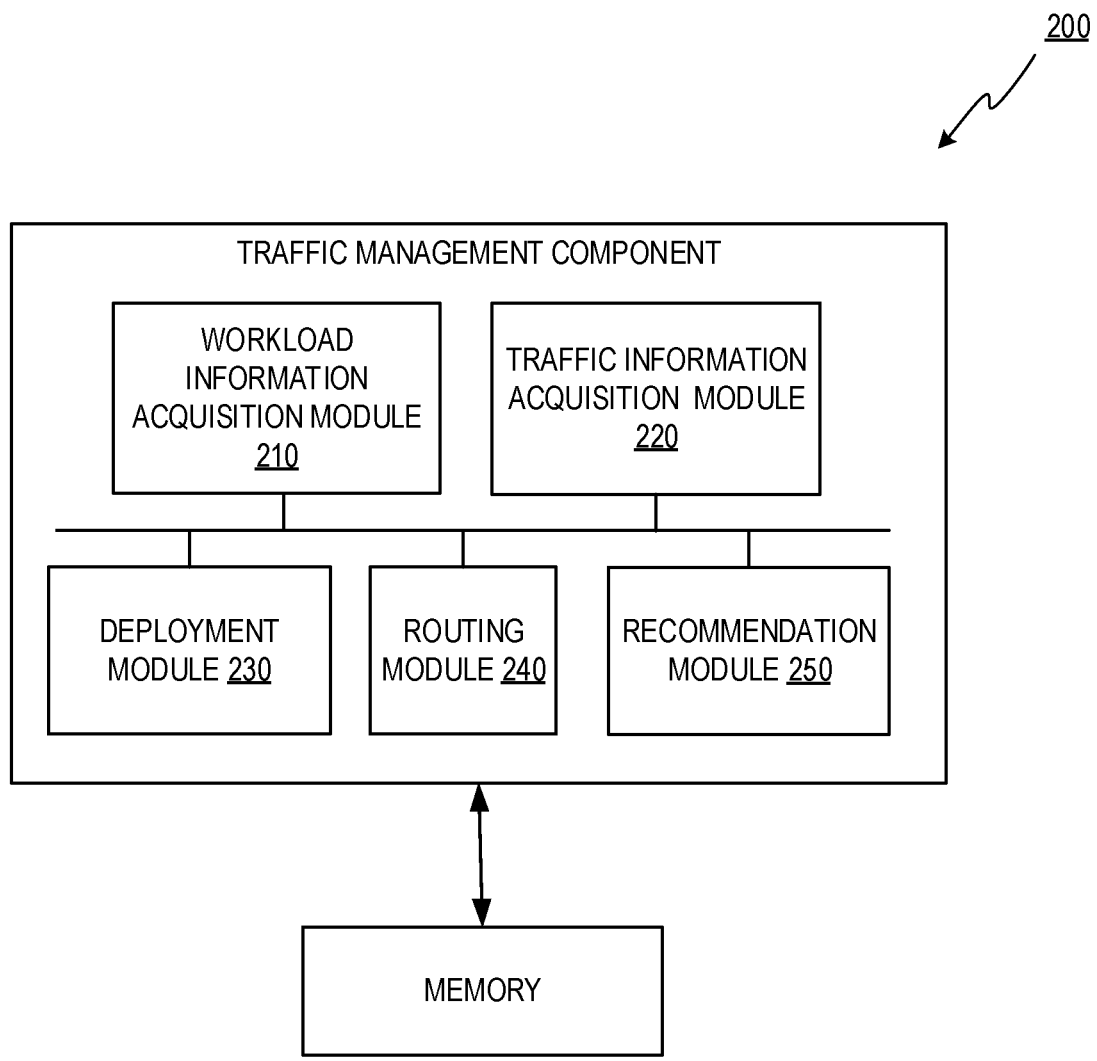
FIG. 2 is a block diagram of a detailed view of a computer system implementing a traffic management component according to an implementation of the disclosure.

FIG. 2 depicts a block diagram illustrating an example 200 of a computer system in accordance with some implementations of the disclosure. The traffic management component of FIG. 2 may be the same as the traffic management component 142 of FIG. 1. As illustrated, the traffic management component may include a workload information acquisition module 210, a traffic information acquisition module 220, a deployment module 230, a routing module 240, and a recommendation module 250. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The workload information acquisition module 210 can acquire information about workloads of an application deployed in a computer system. For example, the workload information acquisition module 210 can acquire information about sizes of workloads of one or more versions of the application deployed and/or to be deployed in the computer system. A size of a workload of a given version of the application may be defined, for example, by the number of instances deployed in the computer system for implementing the given version of the application. In some embodiments, the workload information acquisition module 210 may determine the number of instances of a first version of the application deployed in the computer system, the number of instances of a second version of the application deployed and/or to be deployed in the computer system, etc. The first version of the application may be an old version of the application that has been deployed in the computer system. The second version of the application may be a new version of the application to be deployed in the computer system. In one implementation, the number of the instances of the second version of the application may be provided by one or more user inputs. In another implementation, as will be described in greater detail below, the number of instances of the second version of the application may be determined by the workload information acquisition module 210 in view of traffic information and/or other information related to deployments of the first version of the second version of the application in the computer system.

The traffic information acquisition module 220 can acquire information about traffic that may be handled by one or more versions of an application. For example, the traffic information acquisition module 220 can determine traffic information relating to a first version of the application deployed in a computer system, such as an amount of traffic handled by the first version of the application during a time frame. The time frame may be and/or include any suitable period of time, such as a few minutes, a few hours, a day, etc. In some embodiments, the time frame may be and/or include a random period of time, a period of time designated by a user, etc. The amount of traffic may be handled by one or more instances of the first version of the application during the time frame. Each of the instances of the first version of the application may correspond to a replica of the first version of the application and may be deployed in one or more containers, nodes, etc. of the computer system. The amount of the traffic handled by the first version of the application during the time frame may include the number of requests that the instances of the first version of the application are capable of handling during the time frame.

As another example, the traffic information acquisition module 220 can determine traffic information about a second version of the application to be deployed in the computer system. For example, the traffic information acquisition module 220 can determine an amount of traffic to be routed to the second version of the application. In one implementation, the traffic information acquisition module 210 may determine the amount of traffic to be routed to the second version of the application in view of workload information and/or traffic information relating to the first version of the application deployed in the computer system. For example, the traffic information acquisition module 210 may determine the number of instances of the second version of the application to be deployed in the computer system in view of the number of the instances of the first version of the application deployed in the computer system, the number of the instances of the second version of the application deployed in the computer system, and/or the amount of traffic handled by the first version of the application during the time frame. A ratio of the amount of traffic to be routed to the second version of the application to the amount of traffic handled by the first version of the application during the time frame may be proportional to a ratio of the number of the instances of the second version of the application to the number of the instances of the first version of the application in the computer system. In some embodiments, the traffic information acquisition module 210 may also determine a proportion of traffic destined to the application to be routed to the second version of the application. The proportion of the traffic destined to the application may be determined in view of a ratio of the amount of traffic to be routed to the second version of the application to the amount of traffic handled by the first version of the application during the time frame.

In another implementation, the traffic information acquisition module 220 may determine the amount of traffic to be routed to the second version of the application in view of one or more user inputs, such as a user input of a proportion of traffic destined to the application to be routed to the second version of the application (e.g., 10% of the traffic destined to the application), a maximum amount of traffic that can be routed to the second version of the application, etc.

The deployment module 230 can deploy one or more versions of the application in the computer system. For example, the deployment module 230 may deploy a first plurality of instances of the first version of the application (e.g., the first number of instances of the first version of the application) in the computer system. Each of the first plurality of instances of the first version of the application may be deployed in one or more containers, nodes, and/or any other suitable component of the computer system.

As another example, the deployment module 230 may deploy one or more instances of the second version of the application (also referred to as the "second instances") in the computer system. The deployment module 230 may deploy each of the second instances in one or more containers, nodes, and/or any other suitable component of the computer system. In one implementation, the deployment module 230 may determine the number of the second instances in view of one or more user inputs (e.g., a user input providing the number of the second instances). In another implementation, the deployment module 230 may determine the number of the second instances in view of the workload information related to the first version of the application and the traffic information relating to the deployment of the second version of the application on the computer system. For example, the deployment module 230 can determine that a proportion of the traffic destined to the application is to be routed to the second version of the application (e.g., by determining a ratio of the amount of traffic to be routed to the second version of the application to the amount of traffic handled by the first version of the application during the time frame, by determining the proportion of the traffic destined to the application in view of a user input). The deployment module 230 may further determine the number of the second instances so that a ration of the number of the second instances to the number of the first instances corresponds to the proportion of the traffic destined to the application that is to be routed to the second version of the application.

The routing module 240 can route traffic for the application in view of one or more traffic rules. For example, the routing module 240 may split traffic destined to the application by routing a proportion of the traffic destined to the application to a given version of the application. More particularly, for example, the routing module 240 may route a first portion of the traffic destined to the application to the first version of the application (e.g., the first plurality of instances of the first version of the application) and may route a second portion of the traffic destined to the application to the second version of the application (e.g., the second plurality of instances of the second version of the application). As another example, the routing module 240 may route traffic to a particular version of the application. More particularly, for example, the routing module 240 may route requests of a certain content to the particular version of the traffic.

The recommendation module 250 can provide recommendations regarding a deployment of the second version of the application. For example, the recommendations may include a recommended amount of traffic to be routed to the second version of the application (e.g., the maximum amount of traffic that may be routed to the second version of the application). As another example, the recommendations may include a recommended workload for the second version of the application, such as a recommended size of the workload (e.g., the number of instances of the second version of the application determined by the workload information acquisition module 210).

The recommendations may be provided to a user related to the deployment of the second version of the application, such as a user that initiates a request to deploy the second version of the application. The recommendations may be provided to a user device related to the user via one or more messages and/or any other suitable data.

Figure 3:
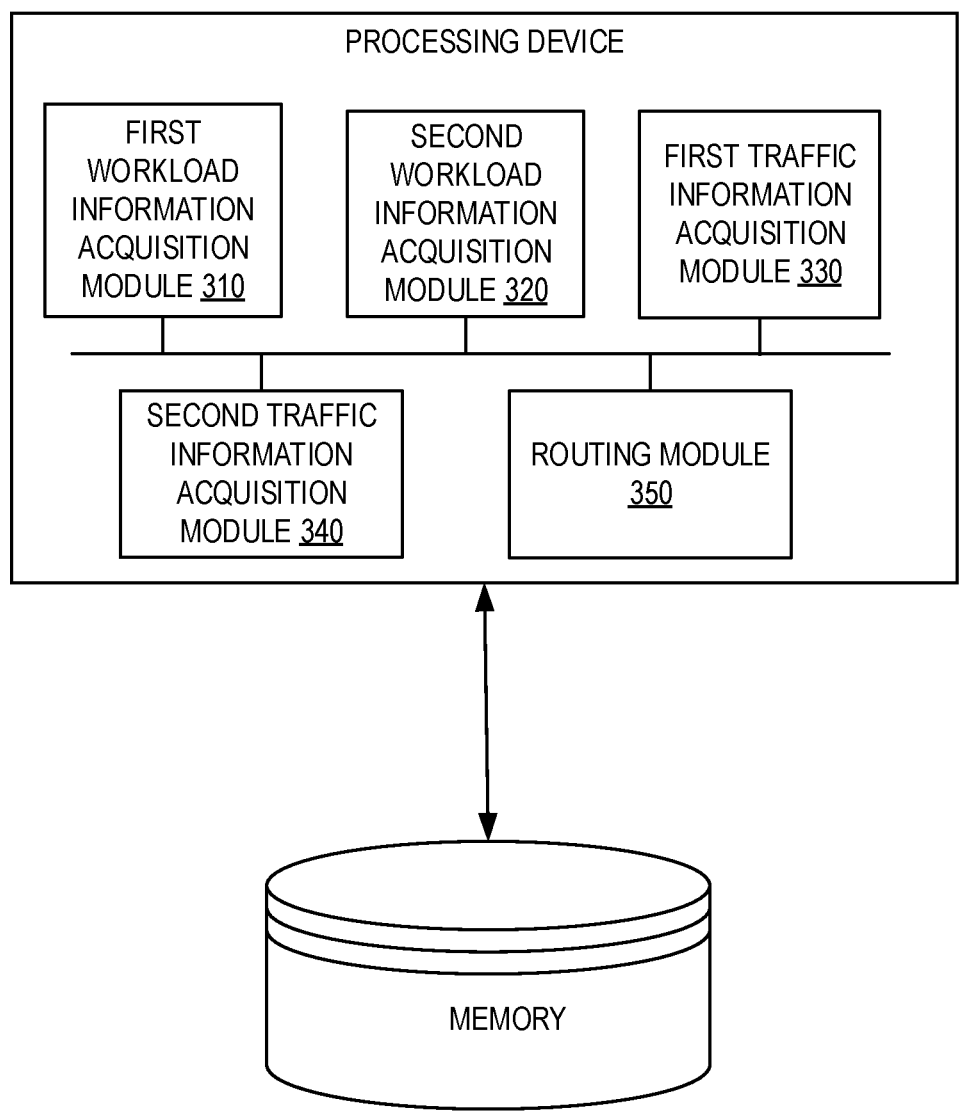
FIGS. 3, 4, and 5 depict block diagrams of example computer systems operating in accordance with one or more aspects of the present disclosure.
Figure 4:
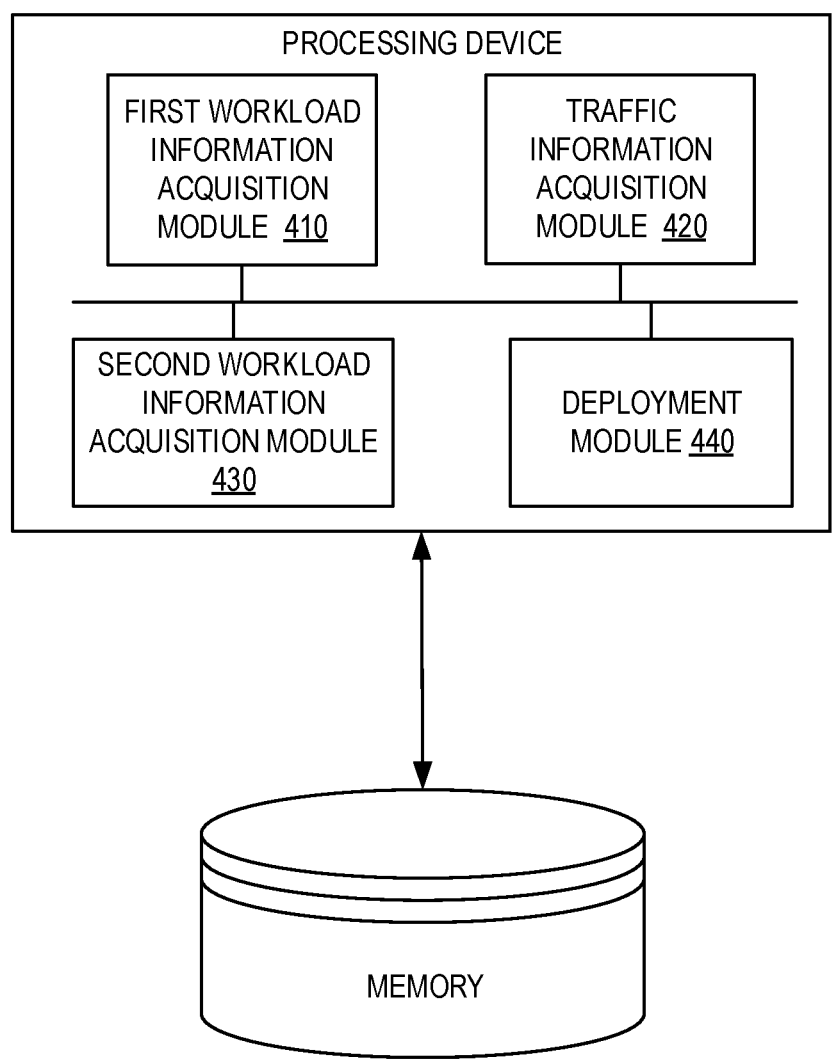

FIGS. 3, 4, and 5 depict block diagrams of example computer systems operating in accordance with one or more aspects of the present disclosure. Each of computer systems 300, 400, and 500 may be the same or similar to computer system 100 and may include one or more processing devices and one or more memory devices. Each of computer systems 300, 400, and 500 may further include a memory storing data for implementing various implementations of the present disclosure.

Referring to FIG. 3, computer system 300 may include a first workload information acquisition module 310, a second workload information acquisition module 320, a first traffic information acquisition module 330, a second traffic information acquisition module 340, and a routing module 350.

The first workload information acquisition module 310 may determine workload information related to a first version of an application deployed in a computer system (also referred to as the "first workload information"). For example, the first workload information acquisition module 310 may determine a size of the workload of the first version of the application deployed in the computer system (e.g., the number of instances of the first version of the application deployed in the computer system).

The second workload information acquisition module 310 may determine workload information related to a second version of an application deployed in a computer system (also referred to as the "second workload information"). For example, the second workload information acquisition module 310 may determine a size of the workload of the second version of the application deployed and/or to be deployed in the computer system (e.g., the number of instances of the second version of the application deployed in the computer system).

The first traffic information acquisition module 330 may determine traffic information related to the first version of the application deployed in the computer system (also referred to as the "first traffic information"). The first traffic information may include, for example, an amount of traffic that the first version of the application is capable of handling during a time frame (e.g., a few minutes, a few hours). The amount of traffic that the first version of the application is capable of handling during the time frame may be measured by the number of requests that the second version of the application handled without a threshold number of errors (e.g., no delay) during the time frame.

The second traffic information acquisition module 340 may determine traffic information related to the second version of the application deployed in the computer system (also referred to as the "second traffic information"). The second traffic information may include, for example, an amount of traffic that may be routed to the second version of the application (e.g., the maximum amount of traffic that may be routed to the second version of the application).

The routing module 350 may route traffic for the application in view of the second traffic information. For example, the routing module 350 may route a first proportion of the traffic for the application (e.g., traffic destined to the application) to the first version of the application deployed in the computer system and may route a second proportion of the traffic for the application to the second version of the application deployed in the computer system.

The second proportion of the traffic for the application may correspond to a portion of the traffic for the application that is not greater than the amount of traffic that may be routed to the second version of the application determined by the second traffic information acquisition module 340. In some embodiments, the routing module 350 may route an initial amount of traffic to the second version of the application deployed in the computer system (e.g., zero or any other amount that is not greater than the amount of the traffic that may be routed to the second version of the application). The routing module 350 may then progressively increase the amount of traffic routed to the second version of the application until routing the maximum amount of traffic that may be routed to the second version of the application.

Referring to FIG. 4, computer system 400 may include a first workload information acquisition module 410, a traffic information acquisition module 420, a second workload information acquisition module 430, and a deployment module 440.

The first workload information acquisition module 410 may determine first workload information related to a first version of an application deployed in a computer system. For example, the first workload information acquisition module 410 may determine a size of the workload of the first version of the application deployed in the computer system (e.g., the number of instances of the first version of the application deployed in the computer system).

The traffic information acquisition module 420 may determine traffic information relating to a deployment of a second version of the application on the computer system. The traffic information comprises information about an amount of traffic to be routed to the second version of the application, such as a proportion of traffic destined to the application that is to be routed to the second version of the application, an amount of traffic that may be routed to the second version of the application (e.g., the maximum amount of traffic that may be routed to the second version of the application), etc.

The second workload information acquisition module 430 may determine second workload information relating to the deployment of the second version of the application. The second workload information may include, for example, the number of instances of the second version of the application to be deployed on the computer system (also referred to as the "second number of instances"). In some embodiments, the second workload information acquisition module 430 may include the second number of instances may be determined in view of the first workload information and the traffic information. The second number of instances may be determined in view of the amount of traffic to be routed to the second version of the application and the first number of instances of the first version of the application. In some embodiments, the amount of traffic to be routed to the second version of the application may be represented by a proportion of traffic destined to the application (e.g., 20%). A ratio of the second number of instances to the first number of instances may correspond to the proportion of the traffic destined to the application.

The deployment module 440 may deploy the second version of the application in the computer system in view of the second workload information. For example, the processing device may deploy the second number of instances in the computer system to implement the second version of the application. In some embodiments, each of the second number of instances may correspond to a replica of the second version of the application and may provide functionality of the second version of the application. Each of the second number of instances may be deployed in one or more containers, nodes, etc. of the computer system.

Referring to FIG. 5, computer system 500 may include a configuration module 510, a deployment module 520, and a routing module 530. The configuration module 510 may acquire performance data related to a first plurality of instances of a first version of an application deployed in a computer system. For example, the performance data may include workload information relating to one or more of the first plurality of instances, such as the number of the first plurality of instances of the first version of the application. As another example, the performance data may include traffic information relating to one or more of the first plurality of intakes, such as an amount of traffic handled by the first plurality of instances of the first version of the application in a time frame.

The configuration module 520 may determine, in view of the performance data, one or more configuration parameters of a deployment of a second version of the application in the computer system. The configuration parameters may include any suitable information that can be used to deploy the second version of the application in the computer system. For example, the configuration parameters may include one or more configuration parameters including workload information of one or more of the second plurality of instances of the second version of the application, such as the number of the second plurality of instances of the second version of the application to be deployed in the computer system. As another example, the configuration parameters may include one or more configuration parameters including traffic information of one or more of the second plurality of instances of the second version of the application, such as an amount of traffic to be routed to the second plurality of instances of the second version of the application, a proportion of traffic destined to the application that is to be routed to the second plurality of instances, a proportion of traffic destined to the application that is to be routed to the first plurality of instances, etc.

The deployment module 520 may deploy, in view of the configuration parameters, a second plurality of instances of the second version of the application in the computer system. For example, the deployment module 520 may deploy the second number of instances in the computer system to implement the second version of the application. Each of the second plurality of instances of the second version of the application may correspond to a replica of the second version of the application. Each of the second plurality of instances of the second version of the application may be deployed in one or more containers, virtual machines, nodes, etc. of the computer system.

The routing module 530 may route traffic for the application to the first plurality of instances of the first version of the application deployed in the computer system and the second plurality of instances of the second version of the application deployed in the computer system. In some embodiments, the routing module 530 may route the traffic for the application in view of one or more of the configuration parameters. For example, the routing module 530 may route a portion of traffic destined to the application to the second plurality of instances of the second version of the application. The portion of traffic destined to the application is not greater than the amount of traffic to be routed to the second plurality of instances of the second version of the application. As another example, the routing module 530 may route a first proportion of the traffic destined to the application to the first plurality of instances of the first version of the application deployed in the computer system and a second proportion of the traffic destined to the application to the second plurality of instances of the second version of the application deployed in the computer system.

Figure 6:
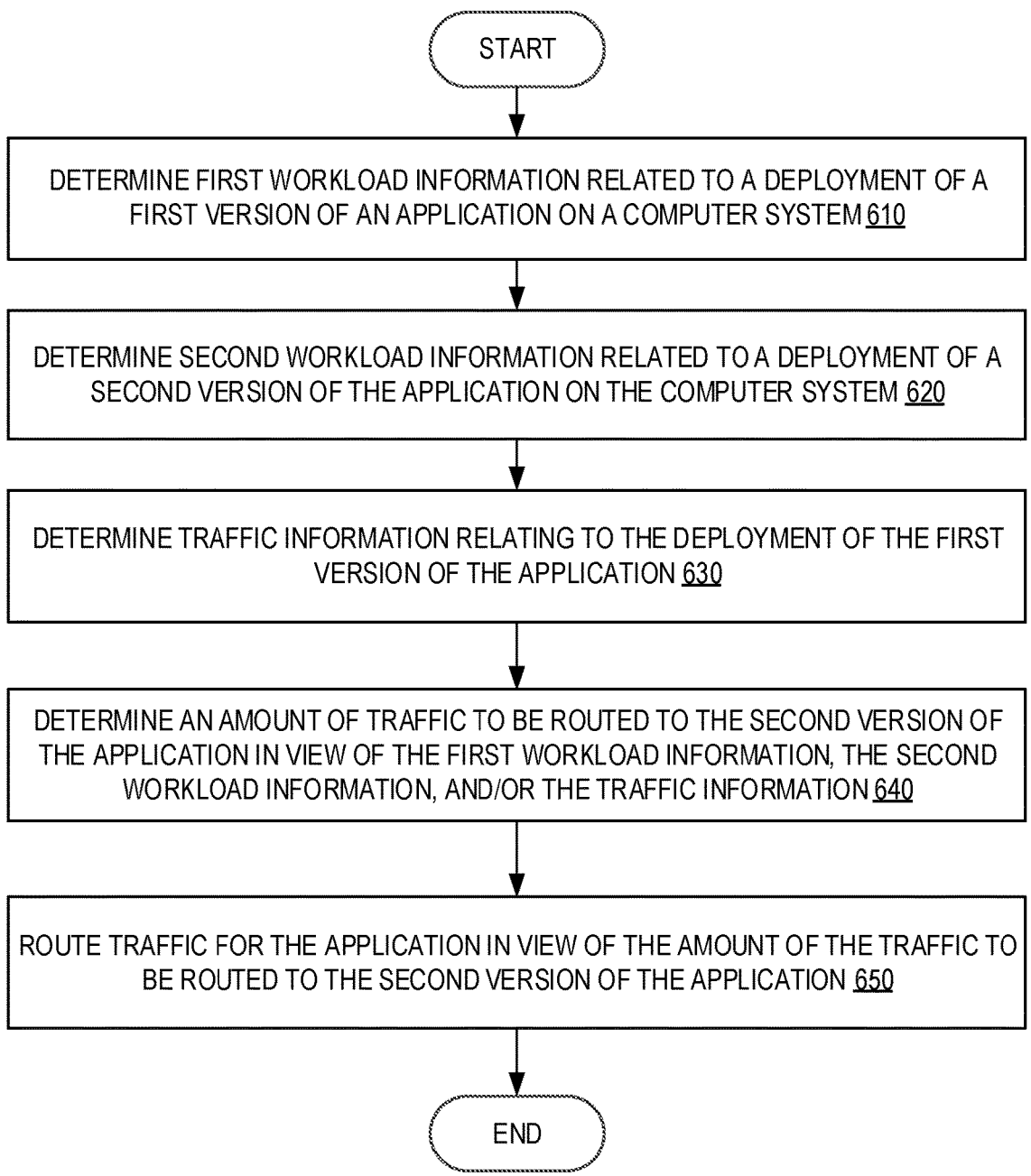
FIG. 6 is a flow diagram illustrating a method for determining traffic information for deploying a new version of an application in a computer system in accordance with some embodiments of the present disclosure.
Figure 7:
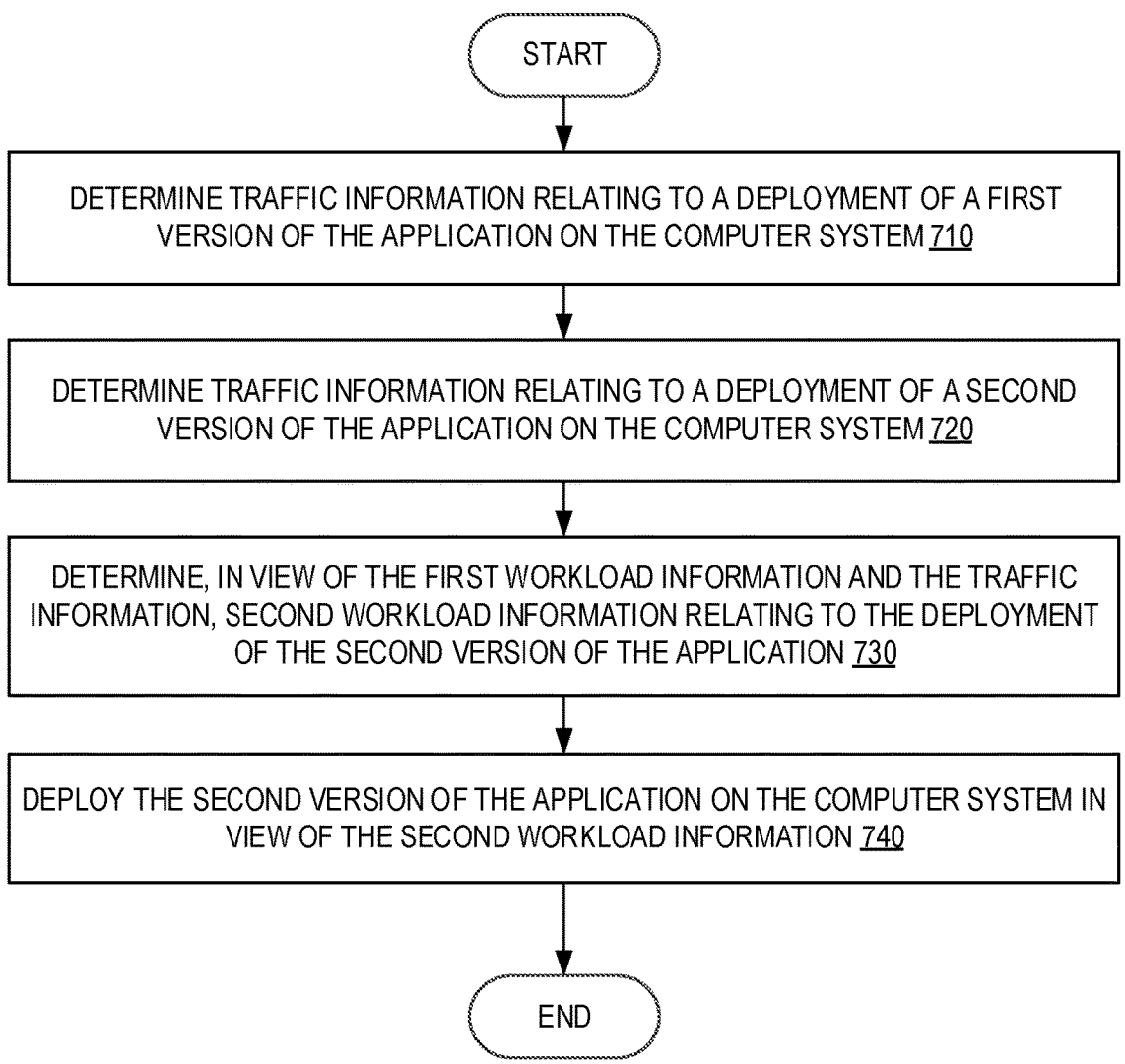
FIG. 7 is a flow diagram illustrating a method for deploying a new version of an application in a computer system in accordance with some embodiments of the present disclosure.
Figure 8:
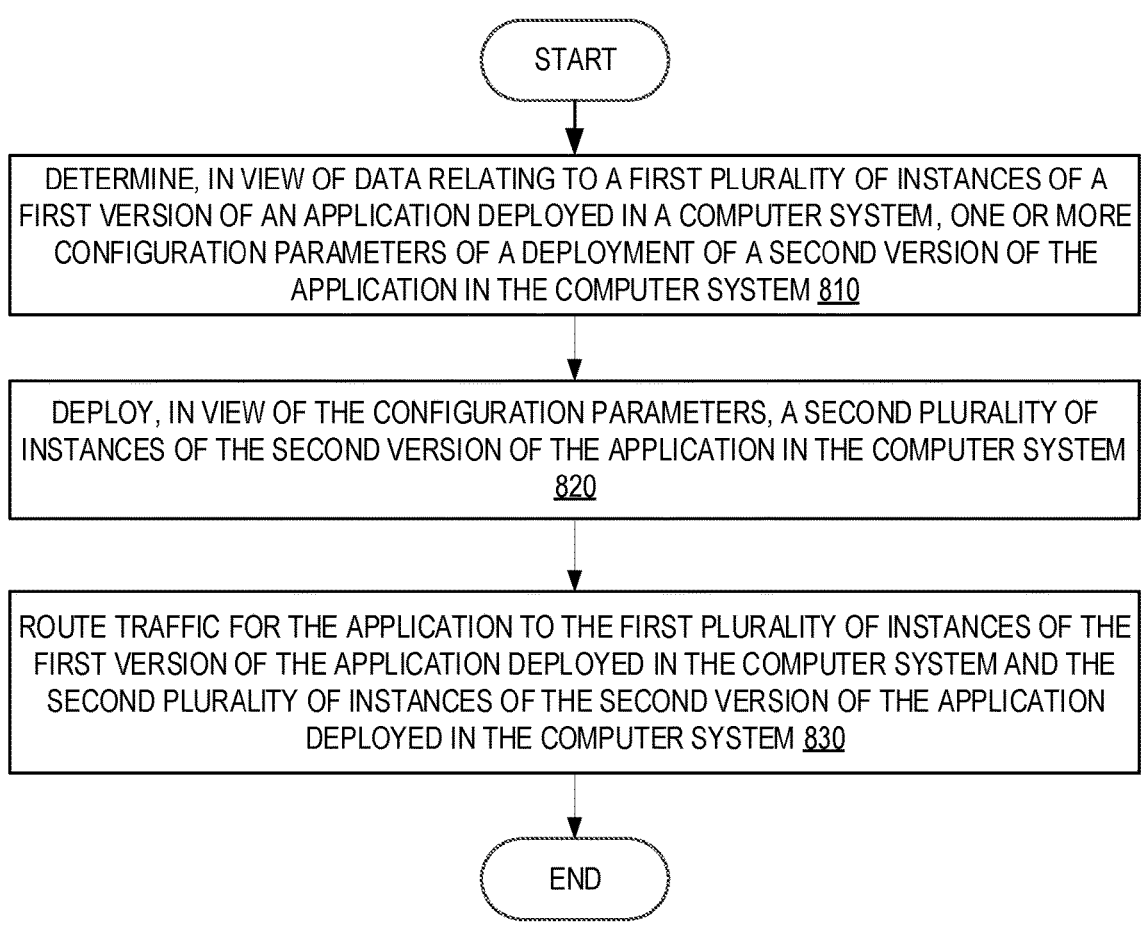
FIG. 8 is a flow diagram illustrating a method for deploying multiple versions of an application in a computer system in accordance with some embodiments of the present disclosure.

FIGS. 6, 7, and 8 are flow diagrams illustrating methods 600, 700, and 800 for memory management in a virtualized computer system in accordance with one or more aspects of the present disclosure. Method 600 illustrates an example process for determining traffic information for a new version of an application in a computer system in accordance with some embodiments of the present disclosure. Method 700 illustrates an example process for deploying a new version of an application in a computer system in accordance with some embodiments of the present disclosure. Method 800 illustrates an example process for deploying multiple versions of applications in a computer system in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Referring to FIG. 6, method 600 begins at block 610 where the processing device may determine first workload information related to a deployment of a first version of an application on a computer system. For example, the processing device can determine the number of instances of the first version of the application (also referred to as the "first number of instances") deployed in the computer system. Each of the first number of instances of the first version of the application may be deployed in one or more containers, virtual machines, nodes, etc. of the computer system. Each of the first number of instances of the first version of the application may correspond to a replica of the first version of the application.

At block 620, the processing device may determine second workload information related to a deployment of a second version of the application on the computer system. For example, the processing device can determine the number of instances of the second version of the application (also referred to as the "second number of instances") deployed and/or to be deployed in the computer system. Each of the second number of instances of the second version of the application may be deployed in one or more containers, virtual machines, nodes, etc. of the computer system. Each of the second number of instances of the first version of the application may correspond to a replica of the second version of the application.

In some embodiments, the second workload information may be provided by a user device and may correspond to one or more user inputs (e.g., a user input of the second number of instances of the second version of the application).

At block 630, the processing device may determine traffic information relating to the deployment of the first version of the application. For example, the processing device may determine an amount of traffic that the first version of the application is capable of handling during a time frame. The time frame may be a few minutes, a few hours, and/or any other suitable period of time. The time frame may be a random period of time, a period of time designated by a user, etc. The amount of traffic that the first version of the application is capable of handling during the time frame may be determined, for example, by determining an amount of traffic (e.g., the number of requests) that the first version of the application handled without errors (or a threshold of errors) during the time frame.

At block 640, the processing device may determine an amount of traffic to be routed to the second version of the application in view of the first workload information, the second workload information, and/or the traffic information. For example, the processing device can determine a relationship between the first workload information and the second workload information and may determine the amount of traffic to be routed to the second version of the application in view of the relationship and the traffic information. In some embodiments, the relationship between the first workload information and the second workload information may be and/or include a proportional relationship represented by a ratio of the second number of instances of the second version of the application to the first number of instances of the first version of the application. The processing device may determine the amount of traffic to be routed to the second version of the application in view of the amount of traffic handled by the first version of the application deployed in the computer system and the ratio (e.g., by multiplying the ratio and the amount of traffic handled by the first version of the application deployed in the computer system).

At block 650, the processing device may also route traffic for the application in view of the amount of the traffic to be routed to the second version of the application. For example, the processing device may route may route a portion of traffic destined to the application to the second version of the application. The portion of the traffic destined to the application is not greater than the amount of traffic to be routed to the second version of the application in some embodiments.

Referring to FIG. 7, method 700 begins at block 710 where the processing device may determine first workload information related to a deployment of a first version of an application on a computer system. For example, the processing device can determine a first number of instances of the first version of the application deployed on the computer system. In some embodiments, each of the first number of instances may correspond to a replica of the first version of the application and may provide functionality of the first version of the application.

At block 720, the processing device may determine traffic information relating to a deployment of a second version of the application on the computer system. The traffic information comprises information about an amount of traffic to be routed to the second version of the application, such as a proportion of traffic destined to the application that is to be routed to the second version of the application, an amount of traffic that may be routed to the second version of the application (e.g., the maximum amount of traffic that may be routed to the second version of the application), etc.

At block 730, the processing device may determine, in view of the first workload information and the traffic information, second workload information relating to the deployment of the second version of the application. For example, the processing device may determine the number of instances of the second version of the application to be deployed on the computer system (also referred to as the "second number of instances"). The second number of instances may be determined in view of the amount of traffic to be routed to the second version of the application and the first number of instances of the first version of the application. In some embodiments, the amount of traffic to be routed to the second version of the application may be represented by a proportion of traffic destined to the application (e.g., 20%). A ratio of the second number of instances to the first number of instances may correspond to the proportion of the traffic destined to the application.

At block 740, the processing device may deploy the second version of the application on the computer system in view of the second workload information. For example, the processing device may deploy the second number of instances of the second version of the application on the computer system. In some embodiments, each of the second number of instances may correspond to a replica of the second version of the application and may provide functionality of the second version of the application. Each of the second number of instances may be deployed in one or more containers, nodes, etc. of the computer system.

Referring to FIG. 8, method 800 begins at block 810 where the processing device may determine, in view of performance data relating to a first plurality of instances of a first version of an application deployed in a computer system, one or more configuration parameters of a deployment of a second version of the application in the computer system. Each of the first plurality of instances of the first version of the application may correspond to a replica of the first version of the application. Each of the first plurality of instances of the first version of the application may be deployed in one or more containers, virtual machines, nodes, etc. of the computer system.

The performance data relating to the first plurality of instances of the first version of the application may include workload information relating to one or more of the first plurality of instances, such as the number of the first plurality of instances of the first version of the application. The performance data relating to the first plurality of instances of the first version of the application may include traffic information relating to one or more of the first plurality of intakes, such as an amount of traffic handled by the first plurality of instances of the first version of the application in a time frame.

The configuration parameters may include any suitable information that can be used to deploy the second version of the application in the computer system. For example, the configuration parameters may include one or more configuration parameters including workload information of one or more of the second plurality of instances of the second version of the application, such as the number of the second plurality of instances of the second version of the application to be deployed in the computer system. As another example, the configuration parameters may include one or more configuration parameters including traffic information of one or more of the second plurality of instances of the second version of the application, such as an amount of traffic to be routed to the second plurality of instances of the second version of the application, a proportion of traffic destined to the application that is to be routed to the second plurality of instances, a proportion of traffic destined to the application that is to be routed to the first plurality of instances, etc.

At block 820, the processing device may deploy, in view of the configuration parameters, a second plurality of instances of the second version of the application in the computer system. For example, the processing device may deploy the second number of instances in the computer system to implement the second version of the application. Each of the second plurality of instances of the second version of the application may correspond to a replica of the second version of the application. Each of the second plurality of instances of the second version of the application may be deployed in one or more containers, virtual machines, nodes, etc. of the computer system.

At block 830, the processing device may route traffic for the application to the first plurality of instances of the first version of the application deployed in the computer system and the second plurality of instances of the second version of the application deployed in the computer system. In some embodiments, the processing device may route the traffic for the application in view of one or more of the configuration parameters. For example, the processing device may route a portion of traffic destined to the application to the second plurality of instances of the second version of the application. The portion of traffic destined to the application is not greater than the amount of traffic to be routed to the second plurality of instances of the second version of the application. As another example, the processing device may route a first proportion of the traffic destined to the application to the first plurality of instances of the first version of the application deployed in the computer system and a second proportion of the traffic destined to the application to the second plurality of instances of the second version of the application deployed in the computer system.

Figure 9:
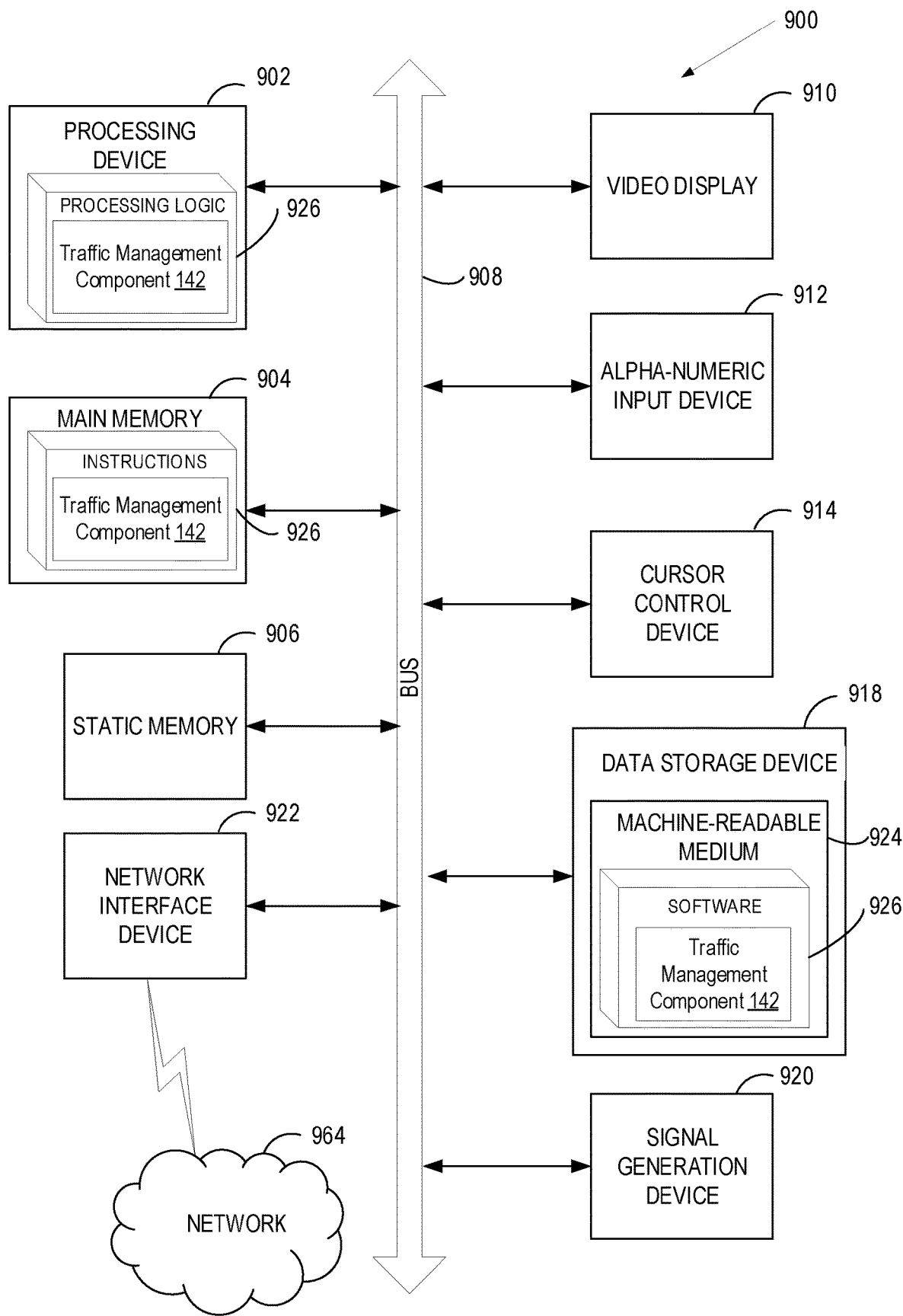
FIG. 9 illustrates a block diagram of one implementation of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to schedule computing tasks, such as the traffic management component 142 as described with respect to FIGS. 1 and 2, and/or a software library containing methods that call the above applications. While the machine-accessible storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: determining first workload information relating to a deployment of a first version of an application in a computer system and second workload information relating to a deployment of a second version of the application in the computer system; determining traffic information relating to the deployment of the first version of the application, wherein the traffic information comprises information about traffic handled by the first version of the application during a time frame; and determining an amount of traffic to be routed to the second version of the application in view of the first workload information, the second workload information, and the traffic information.

Example 2 is the method of example 1, further comprising routing traffic for the application in view of the amount of traffic to be routed to the second version of the application.

Example 3 is the method of example 1, wherein the first workload information relating to the deployment of the first version of the application in the computer system comprises a first number of instances of the first version of the application deployed in the computer system, and wherein the second workload information relating to the deployment of the second version of the application in the computer system in the computer system comprises a second number of instances of the second version of the application deployed in the computer system.

Example 4 is the method of example 3, wherein each of the first number of instances of the first version of the application deployed in the computer system corresponds to a replica of the first version of the application.

Example 5 is the method of example 3, wherein each of the second number of instances of the second version of the application deployed in the computer system corresponds to a replica of the second version of the application.

Example 6 is the method of example 1, wherein determining the traffic information about the deployment of the first version of the application comprises determining an amount of traffic handled by the first version of the application during the time frame.

Example 7 is the method of example 6, wherein the amount of traffic to be routed to the second version of the application is determined in view of the amount of traffic handled by the first version of the application during the time frame and a relationship between the first workload information and the second workload information.

Example 8 is the method of example 1, further comprising receiving the second workload information from a user device.

Example 9 is the method of example 8, further comprising providing information about the amount of traffic to be routed to the second version of the application to the user device.

Example 10 is a method comprising: determining, by a processing device, first workload information relating to a deployment of a first version of an application on a computer system; determining, by the processing device, traffic information relating to a deployment of a second version of the application in the computer system, wherein the traffic information comprises information about an amount of traffic to be routed to the second version of the application; determining, in view of the first workload information and the traffic information relating to the deployment of the second version of the application in the computer system, second workload information relating to the deployment of the second version of the application; and deploying the second version of the application in the computer system in view of the second workload information.

Example 11 is the method of example 10, further comprising receiving, from a user device, a request to deploy the second version of the application in the computer system.

Example 12 is the method of example 11, further comprising: providing the second workload information to the user device.

Example 13 is the method of example 10, wherein the first workload information relating to the deployment of the first version of the application in the computer system comprises a first number of instances of the first version of the application deployed in the computer system.

Example 14 is the method of example 10, wherein the second workload information relating to the deployment of the second version of the application in the computer system comprises a second number of instances of the second version of the application to be deployed in the computer system.

Example 15 is the method of example 14, wherein deploying the second version of the application in view of the second workload information comprises deploying the second number of instances of the second version of the application in the computer system.

Example 16 is the method of example 15, wherein the amount of traffic to be routed to the second version of the application corresponds to a proportion of traffic destined to the application.

Example 17 is the method of example 16, wherein a relationship between the first number of instances to the second number of instances corresponds to the proportion of the traffic destined to the application.

Example 18 is the method of example 17, wherein the relationship between the first number of instances to the second number of instances comprises a ratio of the second number to the first number.

Example 19 is the method of example 10, further comprising determining the traffic information relating to the deployment of the second version of the application in view of a user input.

Example 20 is a method, comprising: determining, in view of performance data relating to a first plurality of instances of a first version of an application deployed in a computer system, one or more configuration parameters of a deployment of a second version of the application in the computer system; deploying, in view of the configuration parameters, a second plurality of instances of the second version of the application in the computer system; and routing traffic for the application to the first plurality of instances of the first version of the application deployed in the computer system and the second plurality of instances of the second version of the application deployed in the computer system.

Example 21 is the method of example 20, wherein the performance data relating to the first plurality of instances of the first version of the application comprises the number of the first plurality of instances of the first version of the application.

Example 22 is the method of example 20, wherein the performance data relating to the first plurality of instances of the first version of the application comprises an amount of traffic handled by the first plurality of instances of the first version of the application in a time frame.

Example 23 is the method of example 20, wherein the one or more configuration parameters comprises the number of the second plurality of instances of the second version of the application.

Example 24 is the method of example 20, wherein the one or more configuration parameters comprises an amount of traffic to be routed to the second plurality of instances of the second version of the application.

Example 25 is the method of example 20, wherein each of the first plurality of instances of the first version of the application corresponds to a replica of the first version of the application.

Example 26 is the method of example 20, wherein each of the second plurality of instances of the second version of the application corresponds to a replica of the second version of the application.

Example 27 is an apparatus comprising: a processing device; a means for determining first workload information relating to a deployment of a first version of an application in a computer system and second workload information relating to a deployment of a second version of the application in the computer system; a means for determining traffic information relating to the deployment of the first version of the application, wherein the traffic information comprises information about traffic handled by the first version of the application during a time frame; and a means for determining an amount of traffic to be routed to the second version of the application in view of the first workload information, the second workload information, and the traffic information.

Example 28 is the apparatus of claim 27, further comprising: means for routing traffic for the application in view of the amount of traffic to be routed to the second version of the application.

Example 29 is the apparatus of claim 27, further comprising: means receiving the second workload information from a user device.

Example 30 is the apparatus of claim 27, further comprising: means for providing information about the amount of traffic to be routed to the second version of the application to the user device.

Unless specifically stated otherwise, terms such as "receiving," "invoking," "associating," "providing," "storing," "performing," "detecting," "initiating," "obtaining," "generating," "determining," "updating," "modifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   determining first workload information relating to a deployment of a first version of an application in a computer system and second workload information relating to a deployment of a second version of the application in the computer system;
   determining traffic information relating to the deployment of the first version of the application, wherein the traffic information specifies a first amount of traffic handled by the first version of the application during a time frame, wherein the first amount of traffic handled is determined in view of a number of requests that the first version of the application handled without errors or without a threshold number of errors during the time frame;
   determining a second amount of traffic to be routed to the second version of the application in view of the first workload information, the second workload information, and the traffic information; and
   routing a third amount of traffic for the second version of the application, wherein the second version of the application is deployed in the computer system in view of the second workload information and in response to a user request, wherein the third amount of traffic is less than the second amount of traffic to be routed to the second version of the application.

2. The method of claim 1 further comprising:
   responsive to detecting that the second version of the application processed the third amount of traffic successfully, routing a fourth amount of traffic that is more than the third amount of traffic to the second version of the application.

3. The method of claim 1, wherein the first workload information relating to the deployment of the first version of the application in the computer system comprises a first number of instances of the first version of the application deployed in the computer system, and wherein the second workload information relating to the deployment of the second version of the application in the computer system in the computer system comprises a second number of instances of the second version of the application deployed in the computer system.

4. The method of claim 3, wherein each of the first number of instances of the first version of the application deployed in the computer system corresponds to a replica of the first version of the application.

5. The method of claim 3, wherein each of the second number of instances of the second version of the application deployed in the computer system corresponds to a replica of the second version of the application.

6. The method of claim 1, wherein determining the traffic information about the deployment of the first version of the application comprises determining an amount of traffic handled by the first version of the application during the time frame.

7. The method of claim 6, wherein the amount of traffic to be routed to the second version of the application is determined in view of the amount of traffic handled by the first version of the application during the time frame and a relationship between the first workload information and the second workload information.

8. The method of claim 1, further comprising receiving the second workload information from a user device.

9. The method of claim 8, further comprising providing information about the amount of traffic to be routed to the second version of the application to the user device.

10. A system, comprising:
    a memory; and
    a processing device, coupled to the memory, to:
    determine first workload information relating to a deployment of a first version of an application in a computer system and second workload information relating to a deployment of a second version of the application in the computer system;
    determine traffic information relating to the deployment of the first version of the application, wherein the traffic information specifies a first amount of traffic handled by the first version of the application during a time frame, wherein the first amount of traffic handled is determined in view of a number of requests that the first version of the application handled without errors or without a threshold number of errors during the time frame;
    determine a second amount of traffic to be routed to the second version of the application in view of the first workload information, the second workload information, and the traffic information; and
    route a third amount of traffic for the second version of the application, wherein the second version of the application is deployed in the computer system in view of the second workload information and in response to a user request, wherein the third amount of traffic is less than the second amount of traffic to be routed to the second version of the application.

11. The system of claim 10, wherein the processing device is further to: provide the second workload information to the user device.

12. The system of claim 10, wherein the first workload information relating to the deployment of the first version of the application in the computer system comprises a first number of instances of the first version of the application deployed in the computer system.

13. The system of claim 10, wherein the second workload information relating to the deployment of the second version of the application in the computer system comprises a second number of instances of the second version of the application to be deployed in the computer system.

14. The system of claim 13, wherein deploying the second version of the application in view of the second workload information comprises deploying the second number of instances of the second version of the application in the computer system.

15. The system of claim 14, wherein the amount of traffic to be routed to the second version of the application corresponds to a proportion of traffic destined to the application.

16. The system of claim 15, wherein a relationship between the first number of instances to the second number of instances corresponds to the proportion of the traffic destined to the application.

17. The system of claim 16, wherein the relationship between the first number of instances to the second number of instances comprises a ratio of the second number to the first number.

18. The system of claim 10, wherein the processing device is further to: determine the traffic information relating to the deployment of the second version of the application in view of a user input.

19. A non-transitory computer-readable storage medium comprising executable instructions that, when executed by a processing device, cause the processing device to:
- determine first workload information relating to a deployment of a first version of an application in a computer system and second workload information relating to a deployment of a second version of the application in the computer system;
- determine traffic information relating to the deployment of the first version of the application, wherein the traffic information specifies a first amount of traffic handled by the first version of the application during a time frame, wherein the first amount of traffic handled is determined in view of a number of requests that the first version of the application handled without errors or without a threshold number of errors during the time frame;
- determine a second amount of traffic to be routed to the second version of the application in view of the first workload information, the second workload information, and the traffic information; and
- route a third amount of traffic for the second version of the application, wherein the second version of the application is deployed in the computer system in view of the second workload information and in response to a user request, wherein the third amount of traffic is less than the second amount of traffic to be routed to the second version of the application.

* * * * *